United States Patent [19]

Keller et al.

[11] Patent Number: 4,601,725

[45] Date of Patent: Jul. 22, 1986

[54] THIOPHENE BASED FUGITIVE COLORANTS

[75] Inventors: Margaret S. Keller, Inman; Edward W. Kluger, Pauline, both of S.C.

[73] Assignee: Milliken Research Corporation, Spartanburg, S.C.

[21] Appl. No.: 644,339

[22] Filed: Aug. 27, 1984

[51] Int. Cl.$^4$ ............................................. D06P 5/13
[52] U.S. Cl. ......................................... 8/403; 8/922; 8/924; 534/729; 534/751; 534/753
[58] Field of Search ............................ 8/403; 260/152; 534/729

[56] References Cited

U.S. PATENT DOCUMENTS

| | | | |
|---|---|---|---|
| 2,683,647 | 7/1954 | Hagan | 8/604 |
| 2,690,953 | 8/1954 | Livak | 8/403 |
| 2,827,450 | 3/1958 | Towns et al. | 260/152 |
| 2,920,975 | 1/1960 | Livak | 106/35 |
| 3,154,534 | 10/1964 | Gale et al. | 260/198 |
| 3,154,535 | 10/1964 | Graham | 260/198 |
| 3,157,633 | 11/1964 | Kuhn | 260/200 |
| 3,337,525 | 8/1967 | Peters et al. | 260/200 |
| 3,449,319 | 6/1969 | Kuhn | 260/207.5 |
| 3,634,131 | 1/1972 | Foster et al. | 117/161 UC |
| 3,663,262 | 5/1972 | Cogan | 117/62.1 |
| 3,927,044 | 12/1975 | Foster et al. | 260/394 |
| 3,929,013 | 12/1975 | Hendrix et al. | 73/160 |
| 3,929,406 | 12/1975 | Farmer et al. | 8/403 |
| 4,091,034 | 5/1978 | Kuhn | 260/391 |
| 4,102,644 | 7/1978 | Hauser et al. | 8/403 |
| 4,113,721 | 1/1978 | Hauser et al. | 534/729 |
| 4,137,243 | 1/1979 | Farmer | 260/378 |
| 4,141,684 | 2/1979 | Kuhn | 8/527 |
| 4,144,028 | 3/1979 | Hauser et al. | 8/403 |
| 4,167,510 | 9/1979 | Brendle | 260/174 |
| 4,255,326 | 3/1981 | Giles et al. | 260/152 |
| 4,282,144 | 8/1981 | Weaver et al. | 260/152 |
| 4,301,068 | 11/1981 | Giles et al. | 260/152 |
| 4,301,069 | 11/1981 | Weaver et al. | 260/152 |

*Primary Examiner*—A. Lionel Clingman
*Attorney, Agent, or Firm*—H. William Petry; Terry T. Moyer

[57] ABSTRACT

Fugitive colorants having the general formula:

$$A-N=N-B-[(C)H]_n$$

wherein A is thiophene or a thiophene derivative, N is nitrogen, B is a nitrogen containing organic dyestuff coupling component, C is a polymer chain bound to nitrogen in the dyestuff coupling component; said polymer chain being selected from polyethylene oxide, polypropylene oxide, polybutylene oxide and copolymers of polyethylene oxide, polypropylene oxide, and/or polybutylene oxide, said polymer chain having about x repeating monomeric units, n is an integer from 1 to 6 and the product of n times x is from about 50 to about 250. A coloration process is also disclosed and claimed.

11 Claims, No Drawings

THIOPHENE BASED FUGITIVE COLORANTS

The present invention relates to thiophene based fugitive colorants for the temporary identification of textile materials.

Various textile materials in the form of fibers, filaments, yarns, fabrics, and the like have heretofore been temporarily identified during various processing operations by way of colorants or tints applied to the textile materials which are ultimately removed. Color coding of the textile materials allows identification and segregation of the materials in a manufacturing facility to avoid erroneous mixing or use of specific materials. Such color coding of textile materials has previously been commercially achieved by the addition of a fugitive colorant or tint to the particular fiber, yarn, or the like in a first or early processing operation, after which the colored material may be properly segregated during subsequent yarn production, fabric forming operations, or the like.

In order to properly, temporarily identify the textile materials, it is important that the particular colorant or tint employed possess certain characteristics which ensure viability of the procedure for a period of time adequate for conversion or processing of the material into a final product state for the particular processing facility. Particular colorants or tints employed serve only as a temporary identification means. It is important if not mandatory, that subsequent to the useful life of same, the particular textile material on which the colorant has been employed should not be adversely affected thereby. In order to achieve success consistent with the dictates noted above, it is essential that the particular colorant excel in at least the below listed characteristics.

Fugitivity

The colorant should exhibit anti-crocking characteristics while also being easily and virtually totally removable from the textile material prior to a conventional dyeing step. Particularly an aqueous scour containing normal surfactants should remove the colorant without any substantial residual color remaining on the textile material.

Colorfastness

The particular colorants should be capable of sustained presence on the textile material when exposed to atmospheric combustion products such as oxides of nitrogen derived from combustion of illuminating or heating gases, processing temperatures, light, and the like without any significant color or shade change.

Lightfastness

Identifying colorants for textile materials should also be specifically resistant to color or shade change when exposed to sunlight or an artificial light source over a prolonged period of time.

Prior art identification colorants of the type referred to herein have generally been referred to as fugitive tints, and in general have enjoyed success in the commercial marketplace. Though fugitive tints have been commercially available for a number of years, certain particular problems continue to exist. Certain prior art fugitive colorants have experienced lightfastness problems, particularly the blue shades and fugitive colorant blends containing blues. In fact, a number of prior art patents listed below allude to problems of lightfastness, and also stability to heat during processing of the textile materials, particularly nylons. Exemplary of prior art fugitive colorants are polyethyleneoxy azos; hydroxyethyl polyethyleneoxy-amino-phenylazo napthalene-1,8-diols; polymeric anthraquinones; and the like which compounds are generally disclosed in U.S. Pat. Nos. 2,683,647 to Hagan 2,690,953 to Livak; 2,920,975 to Livak; 3,154,534 to Gale, et al; 3,154,535 to Graham; 3,157,633 to Kuhn; 3,337,525 to Peters & Kuhn; 3,449,319 to Kuhn; 3,634,131 to Foster & Cogan; 3,663,262 to Cogan; 3,927,044 to Foster & Kuhn; 3,929,013 to Hendrix & Kuhn 3,939,406 to Farmer, et al; 4,091,034 to Kuhn; 4,102,644 to Hauser, et al; 4,113,721 to Hauser & Kuhn; 4,137,243 to Farmer; 4,141,684 to Kuhn; 4,144,028 to Hauser, et al; and 4,167,510 to Brendle.

None of the above noted prior art is believed to teach or suggest the colorants of the present invention.

Many of the prior art fugitive colorants including certain of the ones disclosed in the above patents, rely on polymeric chains of alkylene oxides or copolymers of alkylene oxides to afford water solubility and thus fugitivity for the colorant. While fugitivity characteristics of the prior art colorants are per se, acceptable, as mentioned above, many of the colorants are susceptible to shade and/or color change during prolonged exposure to natural or artificial light sources, which destroys the proper identification symbol for the particular textile material. It has been unexpectedly found, and such is neither shown nor suggested by the prior art, that fugitive colorants according to the present invention not only possess universal fugitivity, but also are extremely lightfast, and colorfast.

It is thus an object of the present invention to provide novel fugitive colorants for use in the identification of textile materials.

Another object of the present invention is to provide novel fugitive colorants for application to textile materials which colorants are water soluble, lightfast and colorfast.

Still another object of the present invention is to provide novel thiophene based fugitive colorants for application to textile materials.

Yet another object of the present invention is to provide an improved method for the temporary coloration of textile materials.

Generally speaking, fugitive colorants according to teachings of the present invention have the following general formula:

wherein A is thiophene or a thiophene derivative, N is nitrogen, B is a nitrogen containing organic dyestuff coupling component, C is a polymer chain bound to nitrogen in the dyestuff coupling component, said polymer chain being selected from polyethylene oxide, polypropylene oxide, polybutylene oxide and copolymers of polyethylene oxide, polypropylene oxide, and/or polybutylene oxide; said polymer chain having about x repeating monomeric units, n is an integer from 1 to 6 and the product of n times x is from about 50 to about 250.

More specifically, but without limitation the thiophene radical present in the polymeric fugitive colorants according to the present invention may have the structure

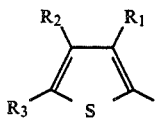

wherein $R_1$, $R_2$, and $R_3$ are selected from halogen, carboxylic acid, alkanoyl, aryloyl, alkyl, aryl, cyano, sulfonylalkyl, sulfonylaryl, thioalkyl, thioaryl, sulfinylalkyl, sulfinylaryl, dithioalkyl, dithioaryl, thiocyano, amidoalkyl, amidodialkyl, oxyalkyl, oxyaryl, hydrogen, sulfonamidoalkyl, sulfonamidoaryl, sulfonamidodialkyl, sulfonamidodiaryl, carbocyclic forming polymethylene chains, sulfenamidoalkyl, sulfenamidodialkyl, sulfenamidoaryl, sulfenamidodiaryl, sulfinamidoalkyl, sulfinamidodialkyl, sulfinamidoaryl, and sulfinamidodiaryl.

Without limitation, suitable organic dyestuff radicals (B) for inclusion in the fugitive colorants of the present invention include the following:

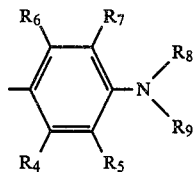

wherein $R_4$, $R_5$, $R_6$, and $R_7$ are selected from hydrogen, alkyl, oxyalkyl, oxyaryl, sulfonamidoalkyl, sulfonamidoaryl, sulfonamidodialkyl, amidoalkyl, amidodialkyl, amidoaryl, amidodiaryl, thioalkyl and thioaryl; and $R_8$ and $R_9$ are sites for attachment of $[(C)_xH]_n$ as defined above though one of $R_8$ or $R_9$ may be hydrogen.

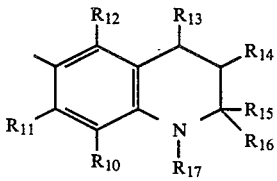

wherein $R_{10}$, $R_{12}$, $R_{13}$, and $R_{14}$ are selected from hydrogen or lower alkyl, $R_{11}$ is selected from hydrogen, lower alkyl, amidoalkyl, amidoaryl, sulfonamidoalkyl, or sulfonamidoaryl, $R_{15}$ and $R_{16}$ are lower alkyl and $R_{17}$ is a site for attachment of $[(C)_xH]_n$ as identified above.

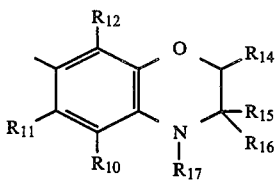

wherein $R_{10}$ through $R_{17}$ have the values given above.

A most preferred fugitive colorant for use according to the present invention has the formula:

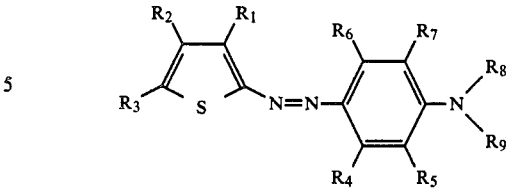

wherein $R_1$ through $R_9$, are as defined above.

Any suitable procedure may be employed to produce the colorants for use in the process of the present invention whereby the polymeric substituent, or substituents, are coupled to an organic dyestuff radical. For example, the procedure set forth in U.S. Pat. No. 3,157,633, incorporated herein by reference, may be employed. Further, it may be desirable to use an organic solvent as the reaction medium since the reactive substituent is preferably in solution when coupled to the organic dyestuff radical. Any suitable organic solution, even an aqueous organic solution, may be employed. The particular shade of the colorant will depend primarily upon the particular dyestuff radical selected. A large variety of colors and shades may be obtained by blending two or more colorants. Blending of the colorants of the present invention can be readily accomplished since all are water soluble.

The polymeric solubility affording substituents (C) for colorants according to the invention are selected from hydroxyalkylenes, polymeric epoxides, such as the polyalkylene oxides and copolymers thereof. Polyalkylene oxides and copolymers of same which may be employed to afford colorants of the present invention with a water solubility characteristic are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. Further, such polymeric substituents have adequate molecular weight to afford water solubility and thus fugitivity for the present colorants. Preferably, referring to the generic formula, n is an integer from 1 to 6 and the product of n times x is from about 50 to about 250, and most preferably in a range of from about 75 to about 150 or 200 to about 250 depending on the product to be tinted.

Generally speaking the method of temporary coloration of textile materials according to teachings of the present invention comprises the steps of providing one or more water soluble polymeric colorants having the formula:

$$A-N=N-B-[(C)H]_n$$

wherein A is a thiophene or a thiophene derivative, N is nitrogen, B is a nitrogen containing organic dyestuff coupling component, C is a polymer chain bound to nitrogen in the dyestuff coupling component; said polymer chain being selected from polyethylene oxide, polypropylene oxide, polybutylene oxide and copolymers of polyethylene oxide, polypropylene oxide, and/or polybutylene oxide, said polymer chain having about x repeating monomeric units, n is an integer of from 1 to 6 and the product of n times x is from about 50 to about 250; providing an aqueous solution of said one or more colorants; bringing said textile material into adequate contact with said aqueous colorant solution for an adequate period of time to appropriately color said textile material; and drying said textile material.

One preferred method for coloring staple fibrous materials for purposes of temporary identification includes the steps of providing one or more of the thiophene based polymeric colorants in aqueous solution form; spraying the solution onto the fibrous materials; carding the fibers to ensure proper coloration of same and to process the fibers preparatory to yarn formation; forming the fibers into a yarn; and heat setting the yarn. Thereafter, once it becomes desirable to remove the colorant from the yarn, such as prior to dyeing, the yarn is subjected to a surfactant scour.

As can be seen from the examples set forth hereinafter, the fugitive colorants of the present invention may also yield significant improvement when employed in a blend with other, prior art colorants.

In general, prior art fugitive colorants that experience a major problem with lightfastness are the blues and blends of colors that include blue. The present invention is not, however, limited to blue colorants, but is without color restriction so long as the colorant produced meets the fugitivity, colorfast and lightfast criteria. Moreover, as to the polymeric segment of the compound, the length of same determines the suitability for use with particular materials. For example in a lower acceptable range, e.g., from about 75 to about 150 moles of alkylene oxide, the colorants are suitable for general use in coloration of conventional textile materials such as the natural fibers, polyesters, acrylics and the like. Longer chains of alkylene oxides e.g., in a range of from about 200 to about 250 moles are, however, preferred for coloration of textile materials such as nylon 6, nylon 66, and the like. Also the depth of color of the compound is reduced with increasing polymeric chain lengths.

A better understanding of the fugitive colorants according to the present invention may be had by reference to the following examples.

EXAMPLE 1

One hundred grams of 85% phosphoric acid, 12.5 grams of 98% sulfuric acid, and 2 drops of 2-ethylhexanol were added to a 250 cc flask, after which the mixture was cooled and 8.2 grams of 2-amino-4-methyl-2,5-dicyanothiophene was added to the flask. The mixture was then further cooled to below 0° Centigrade after which 19 grams of 40% nitrosyl sulfuric acid were added while maintaining the temperature below 0° Centigrade. After three hours the mixture gave a positive nitrite test and 1 gram of sulfamic acid was added and a vacuum pulled. A negative nitrite test was evident after one further hour.

A 2000 cc beaker was charged with 1116 grams of 2,5-dimethoxyaniline 250 EO (55% solids), 360 grams of water and 4 grams of urea. The mixture was cooled to 5° Centigrade and 64 grams of 30% ammonium phosphate dibasic buffer was added thereto. The diazo solution prepared above was then slowly added to the beaker while maintaining the temperature below 10° Centigrade, and while periodically also adding further dibasic buffer (total 180 grams). The coupled solution was then neutralized with 120 grams of 50% sodium hydroxide solution. A blue polymeric colorant resulted.

EXAMPLE 2

Following the procedures set forth in Example 1, 2-amino-4-methyl-3, 5-diethoxythiophene aniline 200 EO was produced. The following ingredients were utilized.

| 45 grams | ice and water |
|---|---|
| 30 grams | 98% sulfuric acid |
| 2 drops | 2-ethylhexanol |
| 12.85 grams | 2-amino-4-methyl-3,5-diethoxy thiophene |
| 23 grams | 40% nitrosyl sulfuric acid |
| 1 gram | sulfamic acid |
| 890.3 grams | aniline 200 EO polymer (55% solids) |
| 300 grams | ice |
| 600 grams | water |
| 4 grams | urea |
| 90 grams | 32% ammonium phosphate dibasic buffer (second addition) |
| 180 grams | dibasic buffer |
| 120 grams | 50% sodium hydroxide |

A red polymeric colorant resulted.

EXAMPLE 3

Following the procedures of Example 1, 2-amino-3-cyano-4-methyl-5-carboethoxythiophene 2, 5-dimethoxyaniline 250 EO was produced. The following ingredients were employed.

| 100 grams | 85% phosphoric acid |
|---|---|
| 12.5 grams | 98% sulfuric acid |
| 2 drops | 2-ethylhexanol |
| 10.5 grams | 2-amino-3-cyano-4-methyl-5-carboethoxythiophene |
| 19 grams | 40% nitrosyl sulfuric acid |
| 1 gram | sulfamic acid |
| 1100 grams | 2,5-dimethoxyaniline 250 EO (55% solids) |
| 300 grams | ice |
| 600 grams | water |
| 4 grams | urea |
| 90 grams | 32% ammonium phosphate dibasic buffer |
| 180 grams | dibasic buffer (second addition) |
| 120 grams | 50% sodium hydroxide |

A violet polymeric colorant resulted.

EXAMPLE 4

Following the procedures of Example 1, 2-amino-4-methyl-3,5-dicyanothiophene tetramethyltetrahyroquinoline 200 EO was produced. Ingredients utilized included;

| 100 grams | 85% phosphoric acid |
|---|---|
| 12.5 grams | 98% sulfuric acid |
| 2 drops | 2-ethyl hexanol |
| 8.2 grams | 2-amino-4-methyl-3,5-dicyano thiophene |
| 19 grams | 40% nitrosyl sulfuric acid |
| 1 gram | sulfamic acid |
| 979.4 grams | tetramethyltetrahyroquinoline 200 EO (50% solids) |
| 247 grams | water |
| 2 grams | urea |
| 64 grams | 30% ammonium phosphate dibasic buffer |
| 128 grams | dibasic buffer (second addition) |
| 128 grams | 50% sodium hydroxide |

A blue polymeric colorant resulted.

EXAMPLE 5

Following the procedures of Example 1, 2-amino-4-methyl-3,5-dicyanothiophene 2,5-diethoxyaniline 250 EO was produced. The following ingredients were utilized.

| | | |
|---|---|---|
| 100 grams | 85% phosphoric acid | |
| 12.5 grams | 98% sulfuric acid | |
| 2 drops | 2-ethylhexanol | |
| 8.2 grams | 2-amino-4-methyl-3,5 dicyano thiophene | |
| 19 grams | 40% nitrosyl sulfuric acid | |
| 2 grams | sulfamic acid | |
| 1230 grams | 2,5 diethoxyaniline 250 EO (50% solids) | |
| 247 grams | water | |
| 2 grams | urea | |
| 64 grams | 30% ammonium phosphate dibasic buffer | |
| 128 grams | dibasic buffer (second addition) | |
| 128 grams | 50% sodium hydroxide | |

A blue polymeric colorant resulted.

EXAMPLE 6

Following the procedure set forth in Example 1, 2-amino-3-carbomethoxy-5 isobutyrylthiophene 2,5-dimethoxyaniline 250 EO. Ingredients utilized in preparation of the colorant are listed as follows:

| | | |
|---|---|---|
| 100 grams | 85% phosphoric acid | |
| 15 grams | 98% sulfuric acid | |
| 2 drops | 2-ethylhexanol | |
| 11.3 grams | 2-amino-3-carboethoxy-5-isobutyrylthiophene | |
| 17.5 grams | 40% nitrosyl sulfuric acid | |
| 1.0 grams | sulfamic acid | |
| 1120 grams | 2,5 dimethoxyaniline 250 EO (55% solids) | |
| 360 grams | water | |
| 4 grams | urea | |
| 64 grams | 30% ammonium phosphate dibasic buffer | |
| 120 grams | 50% sodium hydroxide | |

A reddish blue polymeric colorant resulted.

EXAMPLE 7

Evaluation of fugitivity

A commercial fugitive tint having the following formula was tested as to fugitivity according to the following procedure.

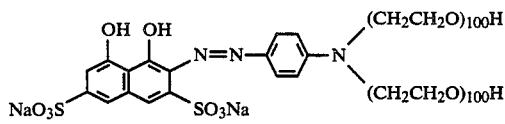

Two grams of the above tint were added to a 200 milliliter beaker along with 98 grams of water, after which the mixture was mixed well. 1.25 grams of the tint solution were dropped onto 5 grams of nylon 6 fiber with an eyedropper after which the tint solution was worked into the fiber with the hands. The tinted fiber was then carded with a small hand card to evenly distribute the tint solution. Thereafter one portion of the tinted nylon fiber was exposed to conventional autoclave heatsetting using saturated steam at 270° F. for 45 minutes, while a second portion of tinted fiber was exposed to dry heat at 150° C. for five minutes. Both fiber portions were then rinsed with cold water for 1 minute after which the samples were observed for remaining color. A lack of color on the nylon fibers indicated good fugitivity of the tint.

EXAMPLES 8-9

Two additional commercial prior art fugitive tints having the formulae set forth below were tested for fugitivity according to the test procedures of Example 7.

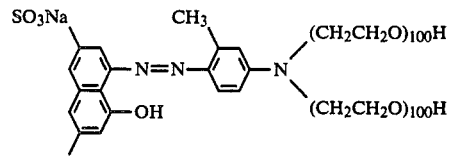

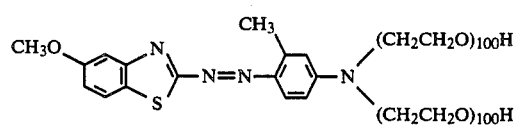

After a cold water scour, virtually all color was removed from the fiber, indicating good fugitivity.

EXAMPLES 10-15

Colorants of Examples 1 through 6 were each tested (Examples 10-15, respectively) as to fugitivity according to the procedures of Example 7. The cold water scour removed virtually all of each of the colorants from the fibers, indicating good fugitivity for all of the colorants, at least comparable to the prior art tints of Examples 7-9.

EXAMPLE 16-24

Colorfastness evaluation

The prior art fugitive tints of Examples 7, 8 and 9 and the colorants according to the present invention of Examples 1-6 were each subjected to the following colorfastness evaluation.

Two grams of the particular fugitive tint or colorant and 98 grams of water were placed in a 200 milliliter beaker and mixed well to achieve a colorant solution. Ten grams of nylon 6 fiber were then provided, and 2.5 grams of the particular tint solution dropped onto the fiber with an eyedropper. The tint was then worked into the fiber by hand and carded with a hand card to evenly distribute the tint solution onto the fiber. The samples were then allowed to air dry overnight after which they were placed in a gas fading apparatus and exposed to oxides of nitrogen from burnt gas fumes until a control sample showed a change in color. Colorfastness ratings were then made by comparing exposed samples to non-exposed samples. The procedure set forth above is standard AATCC Test Method 23-1983. Upon the comparison of the exposed to the non-exposed samples, all three prior art tints changed completely in color while none of the thiophene tints according to the present invention showed any color loss or change thus indicating superiority of the colorants of the present invention to commercially available tints of the prior art.

EXAMPLES 25-33

Lightfastness evaluation

The prior art colorants of Examples 7, 8, and 9 and the thiophene colorants according to the present invention of Examples 1-6 were tested for lightfastness according to the following procedure. An aqueous tint solution was produced as set forth in Example 7 after which a 2½ inch×7 inch polyester fabric sample was placed in the tint solution for 2 minutes. The fabric was then removed and air dried. A like procedure was repeated with a 2½ inch×7 inch nylon 6 fabric sample. The tested fabric samples were then mounted in holders which are covered on both sides after which ½ inch areas were exposed to cycles of 2 hours, 5 hours, and 8 hours in a water-cooled xenon-arc lamp fading apparatus. The apparatus was controlled at 63° Centigrade plus or minus 1° while relative humidity was controlled at 30 percent plus or minus 5 percent. After testing in the fading apparatus, all three prior art tints indicated a 100% color loss after five hours exposure, such that previous color could not be detected. The thiophene colorants according to the present invention experienced only approximately 5 percent color loss after 5 hours exposure and approximately 10-15 percent color loss after 8 hours exposure. Following 8 hours exposure to the fading apparatus, color remaining on samples that were colored by products of the present invention was very detectable by the human eye.

EXAMPLE 34

A purple colorant was produced by blending 50 parts of the prior art blue colorant of Example 7, and 50 parts of the prior art red colorant of Example 8. The colorant blend was subjected to the lightfastness procedures set forth above in Examples 25 to 33. The purple color completely faded after five hours exposure to the xenon-arc lamp fading apparatus.

EXAMPLE 35

Fifty parts of a thiophene based colorant of Example 10 was blended with 50 parts of the prior art red colorant of Example 9 and subjected to the lightfastness evaluation set forth above in Examples 25 to 33. After 8 hours exposure to the xenon-arc lamp fading apparatus, a color loss of approximately 5-10 percent resulted. Remaining color was very detectable by the human eye.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. A polymeric, fugitive colorant of the formula:

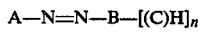

wherein A is thiophene or a thiophene derivative, N is nitrogen, B is a nitrogen containing organic dyestuff coupling component, C is a polymer chain bound to nitrogen in the organic dyestuff coupling component; said polymer chain being selected from polyethylene oxide, polypropylene oxide, polybutylene oxide and copolymers of polyethylene oxide, polypropylene oxide, and/or polybutylene oxide, said polymer chain having about x repeating monomeric units, n is an integer from 1 to 6 and the product of n times x is from about 50 to about 250.

2. A polymeric colorant as defined in claim 1 wherein the colorant has the formula:

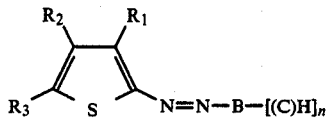

wherein $R_1$, $R_2$, and $R_3$ are selected from halogen, carboxylic acid, alkanoyl, aryloyl, alkyl, aryl, cyano, sulfonylalkyl, sulfonylaryl, thioalkyl, thioaryl, sulfinylalkyl, sulfinylaryl, dithioalkyl, dithioaryl, thiocyano, amidoalkyl, amidodialkyl, oxyalkyl, oxyaryl, hydrogen, sulfonamidoalkyl, sulfonamidoaryl, sulfonamidodialkyl, sulfonamidodiaryl, carbocyclic forming polymethylene chains, sulfenamidoalkyl, sulfenamidodialkyl, sulfenamidoaryl, sulfenamidodiaryl, sulfinamidoalkyl, sulfinamidodialkyl, sulfinamidoaryl, and sulfinamidodiaryl.

3. A polymeric colorant as defined in claim 2 wherein the colorant has the formula:

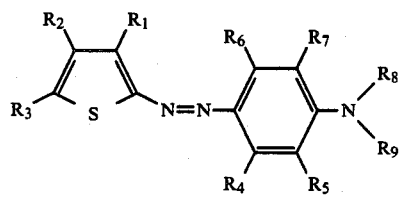

wherein $R_4$, $R_5$, $R_6$, and $R_7$ are selected from hydrogen, alkyl, oxyalkyl, oxyaryl, sulfonamidoalkyl, sulfonamidoaryl, sulfonamidodialkyl, amidoalkyl, amidodialkyl, amidoaryl, amidodiaryl, thioalkyl and thioaryl; and $R_8$ and $R_9$ are sites for attachment of $[(C)H]_n$ as defined above though one of $R_8$ or $R_9$ may be hydrogen.

4. A polymeric colorant as defined in claim 2 wherein the colorant has the formula:

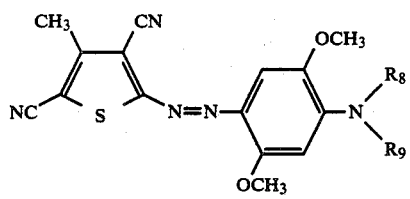

$R_8$ and $R_9$ are sites for attachment of $[(C)H]_n$ as defined above though one of $R_8$ or $R_9$ may be hydrogen.

5. A polymeric colorant as defined in claim 2 wherein the colorant has the formula:

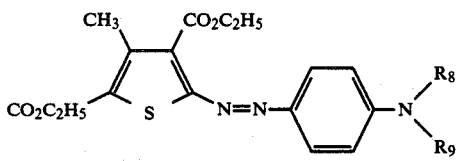

$R_8$ and $R_9$ are sites for attachment of $[(C)H]_n$ as defined above though one of $R_8$ or $R_9$ may be hydrogen.

6. A polymeric colorant as defined in claim 2 wherein the colorant has the formula:

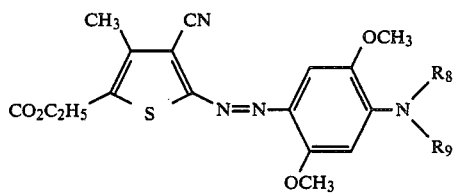

$R_8$ and $R_9$ are sites for attachment of $[(C)H]_n$ as defined above though one of $R_8$ or $R_9$ may be hydrogen.

7. A polymeric colorant as defined in claim 2 wherein the colorant has the formula:

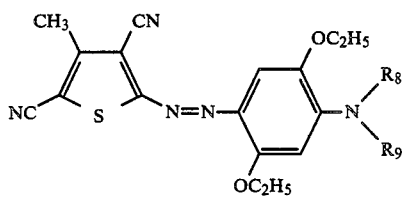

$R_8$ and $R_9$ are sites for attachment of $[(C)H]_n$ as defined above though one of $R_8$ or $R_9$ may be hydrogen.

8. A polymeric colorant as defined in claim 2 wherein the colorant has the formula:

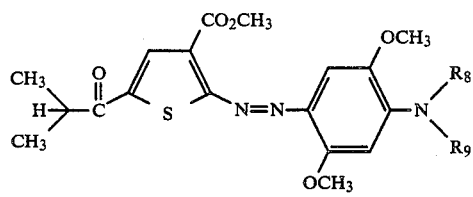

$R_8$ and $R_9$ are sites for attachment of $[(C)H]_n$ as defined above though one of $R_8$ or $R_9$ may be hydrogen.

9. A polymeric colorant as defined in claim 2 wherein the colorant has the formula:

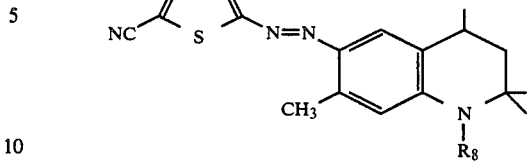

$R_8$ is a site for attachment of $[(C)H]_n$ as defined above.

10. A method of temporary coloration of textile materials comprising the steps of:

(a) providing a colorant having the formula:

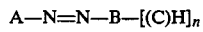

A—N=N—B—[(C)H]$_n$ wherein A is a thiophene or a thiophene derivative, N is nitrogen, B is a nitrogen containing organic dyestuff coupling component, C is a polymer chain bound to nitrogen in the dyestuff coupling component, said polymer chain being selected from polyethylene oxide, polypropylene oxide, polybutylene oxide and copolymers of polyethylene oxide, polypropylene oxide and/or polybutylene oxide, said polymer chain having about x repeating monomeric units, n is an integer from 1 to 6 and the product of n times x is from about 50 to about 250;

(b) producing an aqueous solution of said colorant; and (c) applying said colorant solution onto said textile material.

11. The method as defined in claim 10 wherein the colorant has the formula:

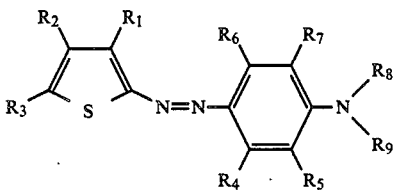

wherein $R_1$, $R_2$, and $R_3$ are selected from halogen, carboxylic acid, alkanoyl, aryloyl, alkyl, aryl, cyano, sulfonylalkyl, sulfonylaryl, thioalkyl, thioaryl, sulfinylalkyl, sulfinylaryl, dithioalkyl, dithioaryl, thiocyano, amidoalkyl, amidodialkyl, oxyalkyl, oxyaryl, hydrogen, sulfonamidoalkyl, sulfonamidoaryl, sulfonamidodialkyl, sulfonamidodiaryl, carbocyclic forming polymethylene chains, sulfenamidoalkyl, sulfenamidodialkyl, sulfenamidoaryl, sulfenamidodiaryl, sulfinamidoalkyl, sulfinamidodialkyl, sulfinamidoaryl, and sulfinamidodiaryl, and wherein $R_4$, $R_5$, $R_6$, and $R_7$ are selected from hydrogen, alkyl, oxyalkyl, oxyaryl, sulfonamidoalkyl, sulfonamidoaryl, sulfonamidodialkyl, amidoalkyl, amidodialkyl, amidoaryl, amidodiaryl, thioalkyl and thioaryl; and $R_8$ and $R_9$ are sites for attachment of $[(C)H]_n$ as defined above though one of $R_8$ or $R_9$ may be hydrogen.

* * * * *